Jan. 19, 1960  G. B. BREBNER  2,921,730
HANDLED BASKET
Filed Dec. 23, 1954
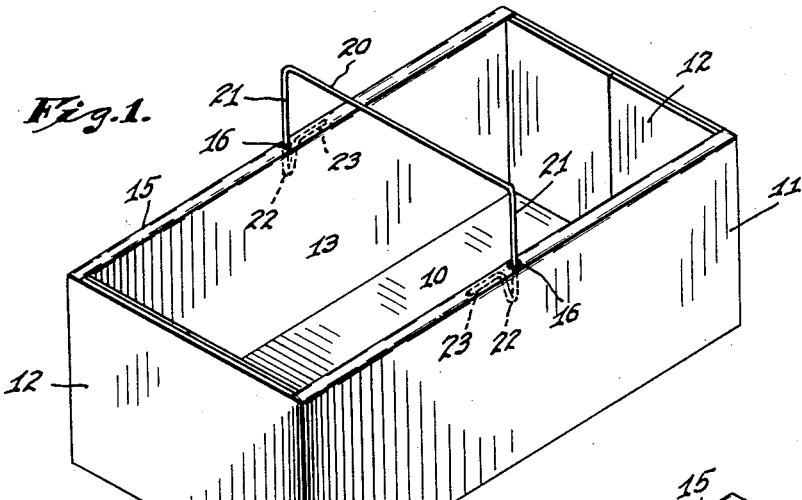
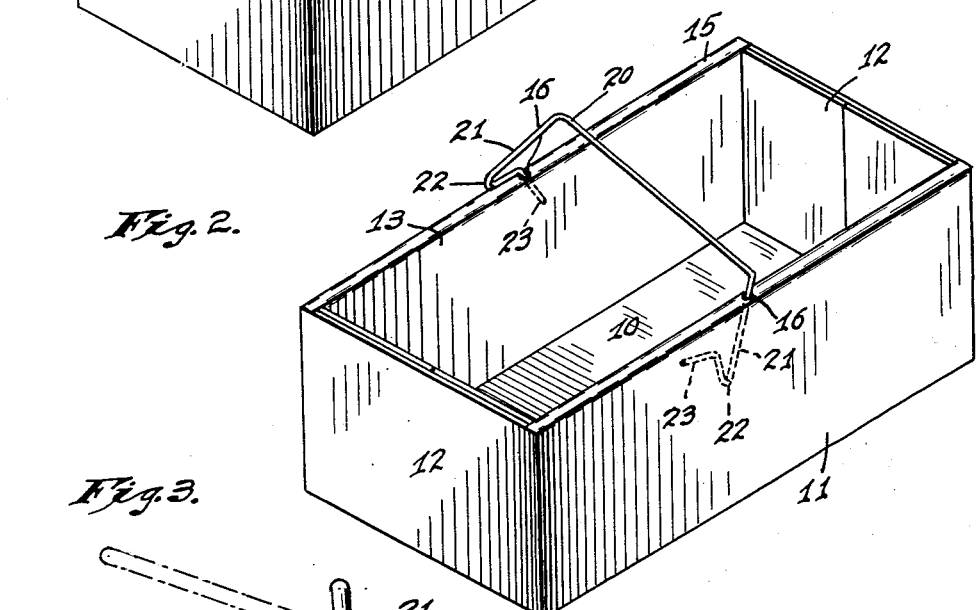
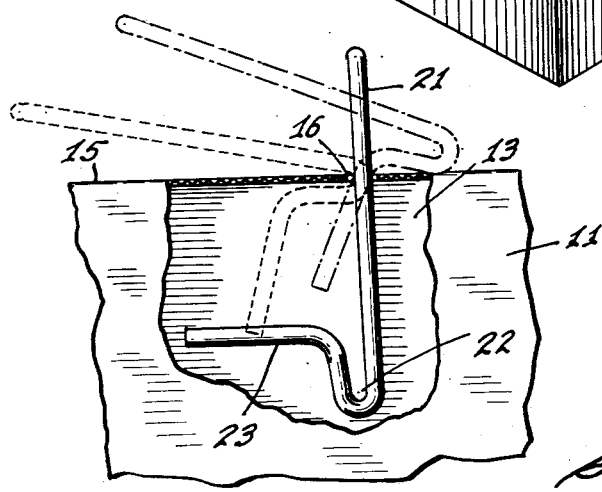
INVENTOR.
GEORGE B. BREBNER,
BY
ATTORNEYS.

United States Patent Office 2,921,730
Patented Jan. 19, 1960

2,921,730

HANDLED BASKET

George B. Brebner, Terre Haute, Ind., assignor to The Weston Paper and Manufacturing Co., Dayton, Ohio, a corporation of Ohio Application December 23, 1954, Serial No. 477,269

4 Claims. (Cl. 229—52)

This invention relates to a basket formed of foldable sheet material, such as corrugated board, and having opposite side walls of double thickness, the two thicknesses of each side wall being integrally joined through a 180° bend or fold defining the upper edge of the wall. It has heretofore been proposed to provide for such a basket a bale-like handle comprising a length of wire bent into an inverted U-shape and having vertical legs which project downwardly through openings in the aforesaid fold into the space between the two wall thicknesses where they are provided with offset portions engageable with the lower surface of the fold to transmit load from the basket to the handle.

It is an object of this invention to simplify the construction and reduce the cost of a basket-handle of the type described. Another object of the invention is to provide a handle of the type described which will so distribute the load transmitted between the basket and the handle as to minimize the likelihood of tearing the fold at the opening therein through which the handle passes. A further object of the invention is to reduce the likelihood that the handle will become accidentally dissociated from the basket.

In carrying out the invention, I form a handle of a length of wire bent into an inverted U-shape to provide two generally parallel vertical legs. The lower portion of each leg is bent through approximately 180° to form an upwardly opening hook-like provision, and the extreme end of the leg, above such hook, is bent outwardly to lie generally perpendicular to the leg. On each leg, the hook and the extreme wire-end lie in a common plane perpendicular to the horizontal or grip portion of the handle; and on the two legs, the bends are oppositely formed. In applying such a handle to the basket, the ends of the vertical legs are inserted through the openings in the side walls of the basket one at a time, the handle being twisted about the axis of its grip portion as may be necessary to permit insertion of the second handle-end after insertion of the first handle-end has been completed.

In the accompanying drawing, which illustrates the invention:

Fig. 1 is an isometric view of a basket showing the handle in operative position;

Fig. 2 is a view similar to Fig. 1 showing the handle in the course of application to the basket; and Fig. 3 is a fragmental side elevation of the basket, with a portion of the basket-side broken away, illustrating successive steps in the insertion of each handle-end into the basket wall.

The basket shown in the drawing is formed of foldable sheet stock, such as corrugated board, to provide a bottom 10, side walls 11, and end walls 12. The side walls have integral flaps or extensions 13 which are folded inwardly to lie against the inner faces of the walls 11, thus providing side walls of double thickness with the two thicknesses of each wall united by a fold or bend 15. Openings 16 provided in the folds 15 at the middle of the basket accommodate application of the handle now to be described.

The handle shown in the drawing comprises a length of wire bent into a general U-shape to provide a generally horizontal intermediate portion or grip 20 and parallel, downwardly extending legs 21. The lower portion of each of the legs 21 is bent through approximately 180° to form an upwardly opening hook 22, and above such hook the extreme end portion 23 of the leg is bent to extend outwardly from and generally perpendicular to the leg 21. Each hook 22 and its associated leg-end 23 lie in a common plane generally perpendicular to the grip 20. In forming the hooks 22 and projections 23, the wire of the two legs 21 is bent oppositely so that the projections 23 extend in opposite directions from the body of the handle.

In applying the handle described to a basket, the ends of the handle are applied one at a time. As a first step in the application of a handle-end, the projection 23 is inserted through the opening 16 to bring the end of the handle into the chain-line position shown in Fig. 3. The handle is then moved generally horizontally into the dotted-line position of Fig. 3 to bring the edge of the opening 16 into the bight of the hook 22, whereupon the handle is swung upwardly and inserted further into the opening 16 until the handle assumes approximately the position shown in full lines in Fig. 3. Before applying the second handle-end to the opposite side wall of the basket, it is desirable to insert the first-applied end as far as possible in order to reduce the extent to which engagement of its projection 23 with the lower surface of the fold 15 will interfere with the manipulation of the handle necessary to effect application of its other end to the basket. With the first-applied end so inserted, as illustrated at the right in Fig. 2, the second handle-end is applied in the same manner as was the first. In effecting application of the second handle, it may be necessary to twist the handle to displace the two legs 21 from the common plane which they normally occupy; and it is desirable that the material of the handle be sufficiently resilient to permit such twisting and subsequent elastic restoration of the handle to its normal position in which the two legs 16 are coplanar.

When both legs 21 and the handle have been applied to the basket in the manner above described, the handle is freely slidable vertically between the extended or elevated position shown in Fig. 1 and a depressed position in which the handle lies substantially flush with the top of the basket and permits a plurality of baskets to be stacked one on top of another. When the handle is in operative position, the weight of the basket and its contents is transmitted to the handle through the projections 23 which, because of the hooks 22, engage the lower surfaces of the folds 12 only at points remote from the openings 16 and thus lessen the likelihood that tears beginning at such openings will occur. Since withdrawal of either handle end from the basket requires a twisting of the handle, the likelihood that the handle will become accidentally dissociated from the basket is reduced.

I claim as my invention:

1. In combination with a basket having opposite side walls, each of said side walls being formed of foldable sheet stock and having two thicknesses joined by a fold at the upper wall-edge, a wire handle of inverted U-shape having a horizontal grip and legs projecting downwardly from said grip, said folds having openings through which said legs may be inserted between the wall-thicknesses, the lower portion of each leg being bent in opposite directions to provide a depending return-bend hook and an extreme leg-end projecting from said hook away from and generally perpendicularly to the leg, said hook and extreme leg-end lying in a plane perpendicular to said grip, the two leg-ends projecting in opposite directions from their respective legs and being engageable with the under sides of said folds to transmit load from the basket to the handle.

2. In combination with a basket having opposite side walls, each of said side walls being formed of foldable sheet stock and having two thicknesses joined by a fold at the upper wall-edge, a wire handle of inverted U-shape having a horizontal grip and legs projecting downwardly from said grip, said folds having openings through which said legs may be inserted between the wall-thicknesses, the lower portion of each leg being bent to form a projection extending generally horizontally and engageable with the under side of the associated fold to transmit load from the basket to the handle, each of said projections being downwardly offset at its junction with the handle-leg and in the common plane of the projection and the handle-leg to prevent engagement of the projection with the fold at the edge of said opening.

3. A wire basket-handle, comprising an intermediate grip and vertical legs projecting downwardly from the ends of said grip, the lower ends of said legs being bent in opposite directions to provide depending return-bend hooks and extreme leg-ends projecting in opposite directions from said hooks and generally perpendicularly to the respective legs, each of said hooks and its extreme leg-end lying in a plane perpendicular to said grip.

4. A wire basket-handle, comprising an intermediate grip and vertical legs projecting downwardly from the ends of said grip, the lower ends of said legs being bent to provide load-transferring projections projecting generally perpendicular to the respective legs, each of said projections being downwardly offset at its junction with the associated leg, and in the common plane of the projection and the handle-leg.

References Cited in the file of this patent
UNITED STATES PATENTS

| | | |
|---|---|---|
| 2,195,070 | Backert | Mar. 26, 1940 |
| 2,636,663 | Hauck | Apr. 28, 1953 |